US012335555B2

(12) United States Patent
Shon et al.

(10) Patent No.: US 12,335,555 B2
(45) Date of Patent: Jun. 17, 2025

(54) ELECTRONIC DEVICE FOR PERFORMING DIGITAL FORENSICS ON IN-VEHICLE INFOTAINMENT ENVIRONMENT AND METHOD THEREOF

(71) Applicant: AJOU UNIVERSITY INDUSTRY-ACADEMIC COOPERATION FOUNDATION, Suwon-si (KR)

(72) Inventors: Tae Shik Shon, Suwon-si (KR); Yeong Hun Shin, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 58 days.

(21) Appl. No.: 18/497,897

(22) Filed: Oct. 30, 2023

(65) Prior Publication Data

US 2024/0267579 A1 Aug. 8, 2024

(30) Foreign Application Priority Data

Feb. 3, 2023 (KR) .......................... 10-2023-0014697

(51) Int. Cl.
*H04N 21/414* (2011.01)
(52) U.S. Cl.
CPC ........................... *H04N 21/41422* (2013.01)

(58) Field of Classification Search
CPC ............ H04N 21/41422; B60W 50/04; B60W 2050/0005; B60W 2556/45; B60R 16/023; G01D 9/28
See application file for complete search history.

(56) References Cited

FOREIGN PATENT DOCUMENTS

KR 10-2014-0074518 6/2014

OTHER PUBLICATIONS

Shin, Yeonghun, et al., "Digital Forensic Case Studies for In-Vehicle Infotainment Systems Using Android Auto and Apple CarPlay," Sensors 2022, Sep. 22, 2022, pp. 1-20.

*Primary Examiner* — Anthony Bantamoi
(74) *Attorney, Agent, or Firm* — Foley & Lardner LLP (57) ABSTRACT

The electronic device for performing digital forensics on an in-vehicle infotainment environment according to an exemplary embodiment of the present invention includes a processor which identifies each specification information of an in-vehicle infotainment (IVI) system installed in a vehicle and a user terminal communicating with the IVI system, collects communication section data generated in a communication section between the IVI system and the user terminal, first device data of the IVI system and second device data of the user terminal through collection methods prepared in response to the specification information, extracts artifacts associated with the in-vehicle infotainment environment by analyzing the communication section data, the first device data and the second device data through analysis methods prepared in response to the specification information, and verifies the artifacts through mutual comparison between the communication section data, the first device data and the second device data.

10 Claims, 7 Drawing Sheets

| IVI System | Artifact | Details |
|---|---|---|
| Android Auto | Vehicle BT Address | 98:49:14:4F:B3:16 |
|  | Vehicle BT Name | BMW 92906 |
|  | Mobile Device Product Name | Galaxy S9+ |
|  | Mobile Device BT Name | SM-G965N |
|  | Mobile Device BT Address | 50:77:05:BE:37:CF |
|  | Phone Book (Contact) | telcom/pb.vcf |
| Apple CarPlay | Vehicle BT Address | A0:56:B2:32:EB:23 |
|  | Vehicle BT Name | BMW 88366 |
|  | Vehicle Device ID | BC:30:7E:67:81:AB |
|  | Vehicle Model Name | F25-NBTEvo-0716 |
|  | Mobile Device BT Name | syh2347's iPhone |
|  | Mobile Device Product Name | iPhone9, 3 (iPhone7) |
|  | Mobile Device BT Firmware | BCM4355C0_17.1.199.5230_Elsa_OS_USI_MCC_TRS_20190827.hcd |
|  | Mobile Device OS Version | 13.3.1 (Build 17050) |
|  | Mobile Device IMEI | 353321083330481 |
|  | Mobile Device IMSI | 450080020035886 |
|  | BT Pairing Pin | 665367 |
|  | Link Layer Encryption Key | 2822d5031202e3de820476958beaab8d |
|  | Link Layer Encryption State | 0x01 |

FIG. 5

| IVI System | Artifact | Details |
|---|---|---|
| Belsee Best Aftermarket Auto (Android Auto) | BT Paired Device List | bt_conf.ini (Bluetooth Name) |
| | Phone Number of BT Paired Device | DateBase1.db (Phone Number) |
| | Pairing Time of BT Paired Device | ivt.log (Unix Timestamp) |
| | BT Communication Log | SETTINGS.xml |
| | Vehicle Location | (Latitude, Longitude) |

FIG. 6

| IVI System | Artifact | Details |
|---|---|---|
| Android Auto | Android Auto App List in Use | com.google.android.projection.gearhead.common.HOTSEAT.xml (Package Name) |
| | BT MAC Address of Paired Vehicle | common_user_settings.xml (MAC Address) |
| | Name of Paired Vehicle | common_user_settings.xml (Bluetooth Name) |
| | Last Used Time | app_state_shared_preferences.xml (UNIX Timestamp) |
| | Projected Activation Time | app_state_shared_preferences.xml (UNIX Timestamp) |
| | Disconnection Time | carservice.xml (UNIX Timestamp) |
| | Wi-Fi Connection History | Timestamp (MM-DD HH:MM:SS) |
| | Google Assistance History [13] | binarypb File |
| Apple CarPlay | BT MAC Address of Paired Vehicle | com.apple.carplay.plist (MAC Address) |
| | Name of Paired Vehicle | com.apple.carplay.plist (Bluetooth Name) |
| | Last Used Time | com.apple.carplay.plist (UNIX Timestamp) |
| | Last Siri Conversation | PreviousConversation.plist (Text) |

FIG. 7

ELECTRONIC DEVICE FOR PERFORMING DIGITAL FORENSICS ON IN-VEHICLE INFOTAINMENT ENVIRONMENT AND METHOD THEREOF

CROSS-REFERENCE TO RELATED APPLICATION

This application claims priority to and the benefit of Korean Patent Application No. 10-2023-0014697, filed on Feb. 3, 2023, the disclosure of which is incorporated herein by reference in its entirety.

TECHNICAL FIELD

The present invention relates to an electronic device and method for performing digital forensics on an in-vehicle infotainment environment.

The present invention is derived from research conducted as part of the Ministry of Science and ICT's support project [Project Unique Number: 1711170476, Project Number: 2022-0-01022 (2022-1-01022-001), Research Project Name: Development of technology for collecting and integrating the analysis of artifacts inside and outside automobiles by constructing event-based experimental system, Research Period: Apr. 1, 2022 to Dec. 31, 2024]

BACKGROUND ART

Vehicle systems are one of the fastest growing fields in recent years, and vehicles are receiving considerable attention from a forensic perspective as they are very useful in understanding driver behavior. Previously, extensive forensic studies have been conducted on on-board vehicle systems such as electronic control units (ECUs) or data recording devices that are present in the manufacturer-based infotainment systems.

However, unlike previous vehicles that only used the manufacturer-based infotainment systems, most vehicles nowadays are equipped with in-vehicle infotainment (IVI) systems such as Android Auto and Apple CarPlay.

Such an in-vehicle infotainment system is wirelessly connected to a user terminal such as the driver's smartphone such that it can perform wireless communication with the outside, which was not present in the previous in-vehicle infotainment environment. As a result, the driver can use more services than ever before in the vehicle, and various data are stored in the vehicle as the user terminal is connected to both of the vehicle and the cloud.

Since these data include a significant amount of data that is helpful in solving problems, digital forensics on the in-vehicle infotainment environment is becoming more and more important.

However, in the process of wireless communication, the driver's personal information or the vehicle environment itself can be easily exposed to cyber security threats, and it is highly likely to be abused by cybercrimes.

In addition, since the conventional digital forensic technology on the in-vehicle infotainment environment is performed based on data that is obtainable from the physical storage of the device under investigation, the situation is that there is a limitation to the collection of digital evidence, when it is applied to the latest environment operating based on wireless communication.

RELATED ART DOCUMENTS

Patent Documents

Korean Patent Application No. 10-2014-0074518 (Jun. 18, 2014)

DISCLOSURE

Technical Problem

An object of the present invention is to provide an electronic device and method for performing digital forensic analysis on a wireless communication environment of an in-vehicle infotainment.

Another object of the present invention is to provide an electronic device and method which are capable of checking and responding in advance to the driver's personal information protection problems that may occur when wireless communication is exposed to the outside.

Technical Solution

The electronic device for performing digital forensics on an in-vehicle infotainment environment according to an exemplary embodiment of the present invention includes a processor which identifies each specification information of an in-vehicle infotainment (IVI) system installed in a vehicle and a user terminal communicating with the IVI system, collects communication section data generated in a communication section between the IVI system and the user terminal, first device data of the IVI system and second device data of the user terminal through collection methods prepared in response to the specification information, extracts artifacts associated with the in-vehicle infotainment environment by analyzing the communication section data, the first device data and the second device data through analysis methods prepared in response to the specification information, and verifies the artifacts through mutual comparison between the communication section data, the first device data and the second device data.

The processor may collect the communication section data through a first collection method prepared in response to an operating system type and operating system version of the user terminal among the specification information.

The processor may collect the first device data through a second collection method prepared in response to the PCB specification of the IVI system and the presence of an external storage among the specification information.

The processor may collect the second device data through a third collection method prepared in response to the PCB specification, operating system type and operating system version of the user terminal among the specification information.

The processor may analyze the first device data through a first analysis method prepared in response to an operating system type and operating system version of the IVI system among the specification information, and analyze the second device data through a second analysis method prepared in response to an operating system type and operating system version of the user terminal among the specification information.

The method for performing digital forensics on an in-vehicle infotainment environment which is performed by an electronic device according to an exemplary embodiment of the present invention includes the steps of identifying each specification information of an in-vehicle infotainment (IVI)

system installed in a vehicle and a user terminal communicating with the IVI system; collecting communication section data generated in a communication section between the IVI system and the user terminal, first device data of the IVI system and second device data of the user terminal through collection methods prepared in response to the specification information; extracting artifacts associated with the in-vehicle infotainment environment by analyzing the communication section data, the first device data and the second device data through analysis methods prepared in response to the specification information; and verifying the artifacts through mutual comparison between the communication section data, the first device data and the second device data.

The step of collecting may include the step of collecting the communication section data through a first collection method prepared in response to an operating system type and operating system version of the user terminal among the specification information.

The step of collecting may include the step of collecting the first device data through a second collection method prepared in response to the PCB specification of the IVI system and the presence of an external storage among the specification information.

The step of collecting may include the step of collecting the second device data through a third collection method prepared in response to the PCB specification, operating system type and operating system version of the user terminal among the specification information.

The step of analyzing may include the steps of analyzing the first device data through a first analysis method prepared in response to an operating system type and operating system version of the IVI system among the specification information; and analyzing the second device data through a second analysis method prepared in response to an operating system type and operating system version of the user terminal among the specification information.

Advantageous Effects

According to an exemplary embodiment of the present invention, by directly collecting and analyzing wireless communication section data of the in-vehicle infotainment environment, it is possible to expand the range of digital forensics and driver's personal information protection against cyber-attack threats that may occur in the wireless communication section.

According to an exemplary embodiment of the present invention, since it is a base technology that analyzes the wireless communication section of the in-vehicle infotainment environment and collects and indexes digital evidence stored in each device, it is possible to expect good effects in the economic and social aspects in the field of digital forensic investigation based thereon.

MODES OF THE INVENTION

Hereinafter, preferred exemplary embodiments according to the present invention will be described in detail with reference to the accompanying drawings. The detailed description set forth below in conjunction with the accompanying drawings is intended to describe the exemplary embodiments of the present invention and is not intended to represent the only exemplary embodiments in which the present invention may be practiced. In order to clearly describe the present invention in the drawings, parts that are irrelevant to the description may be omitted, and the same reference numerals may be used for the same or similar components throughout the specification.

Figure 1:
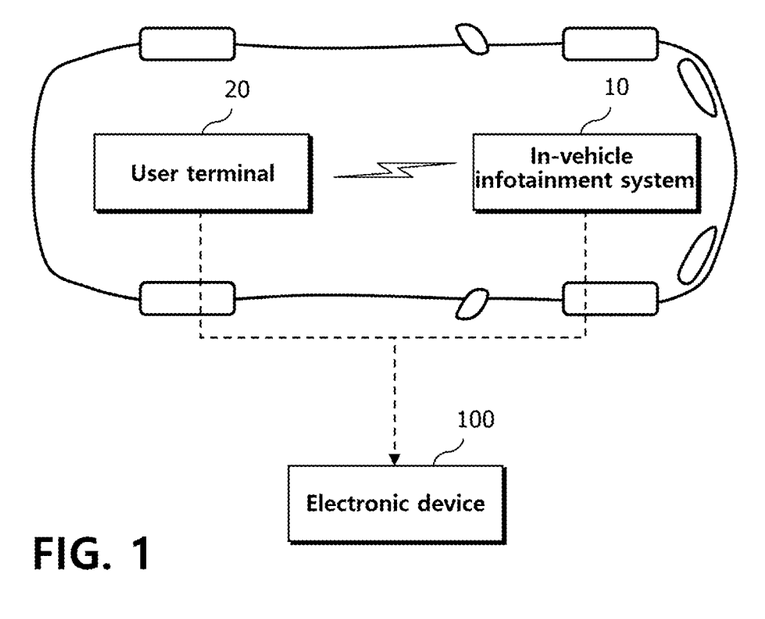
FIG. 1 is a schematic diagram illustrating an in-vehicle infotainment environment according to an exemplary embodiment of the present invention.

FIG. 1 is a schematic diagram illustrating an in-vehicle infotainment environment according to an exemplary embodiment of the present invention.

Referring to FIG. 1, the in-vehicle infotainment environment includes an in-vehicle infotainment system 10 (hereinafter, also referred to as an IVI system 10) and a user terminal 20.

According to an exemplary embodiment of the present invention, the IVI system 10 is an integrated system that provides various functions to a vehicle driver by combining information, which means necessary information such as road driving conditions or road guidance, and entertainment, which means various entertainment and human-friendly functions. Representative examples of the IVI system 10 include Android Auto and Apple CarPlay.

According to an exemplary embodiment of the present invention, the user terminal 20 is a mobile device used by a vehicle driver and/or a passenger of the vehicle, and it may be implemented as a smart phone, a laptop computer, a tablet PC or the like.

The user terminal 20 may communicate with the IVI system 10 to provide various infotainment functions such as navigation, use of contents such as music or video, phone call and messenger while the driver and/or passenger use the vehicle.

However, as described above, when performing wireless communication between the IVI system 10 and the user terminal 20, there is a high risk of being exposed to various security vulnerabilities. For example, if a secure element such as authentication or encryption is not applied to the vehicle's wireless communication, an attacker can easily modify the message, and such modification is difficult to detect.

Accordingly, the driver's personal information or the vehicle environment itself may be exposed to cyber security threats, and thus, it is necessary to research how to perform digital forensics in the event of a cyber-attacks or crime on the vehicle.

In addition, when the vehicle or the user terminal 20 that communicates with the IVI system 10 of the vehicle is used for a crime or is subject to investigation, research is needed on how to perform digital forensics such that the investigative agency can collect information exchanged between the IVI system 10 and the user terminal 20 and information stored on each device.

The present invention proposes an electronic device 100 and method for performing digital forensics on a wireless communication section between the IVI system 10 and the user terminal 20 and on each of the IVI system 10 and the user terminal 20.

According to an exemplary embodiment of the present invention, the electronic device 100 is a device that performs digital forensics on an in-vehicle infotainment environment, and it may be implemented as a computer, server or the like.

According to an exemplary embodiment of the present invention, the electronic device 100 may perform a check on the driver's personal information protection problems that may occur when wireless communication is exposed to the outside through performing digital forensics, and it may respond in advance.

Hereinafter, the configuration and operation of the electronic device 100 according to an exemplary embodiment of the present invention will be described in detail with reference to the drawings.

Figure 2:
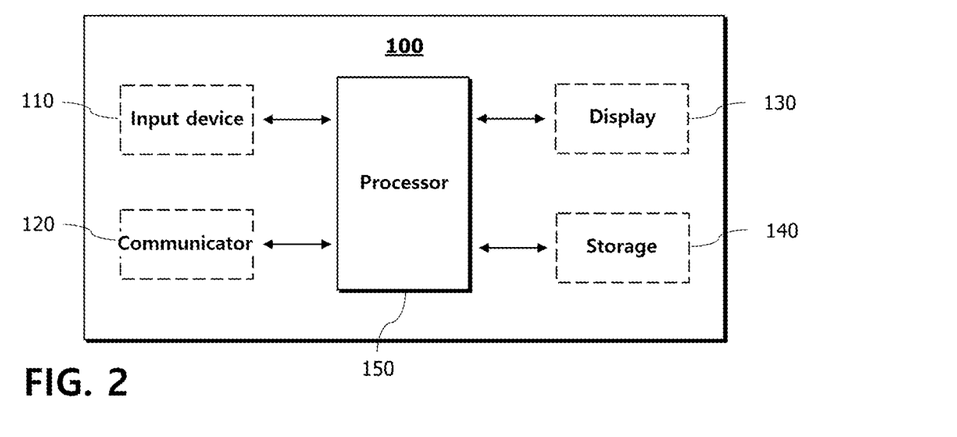
FIG. 2 is a block diagram showing the configuration of an electronic device according to an exemplary embodiment of the present invention.

FIG. 2 is a block diagram showing the configuration of an electronic device according to an exemplary embodiment of the present invention.

The electronic device 100 according to an exemplary embodiment of the present invention includes an input device 110, a communicator 120, a display 130, a storage 140 and a processor 150.

The input device 110 generates input data in response to a user input of the electronic device 100. For example, the user input may be a user input for starting the operation of the electronic device 100, a user input for inputting each specification information of the IVI system 10 and the user terminal 20, a user input for selecting a predefined collection method or analysis method and a user input for performing data collection or analysis, and in addition to the above, in the case of a user input that is required to perform forensic analysis, it is applicable without limitation.

The input device 110 includes at least one input means. The input device 110 may include a keyboard, a key pad, a dome switch, a touch panel, a touch key, a mouse, a menu button and the like.

The communicator 120 performs communication with an external device such as the IVI system 10, the user terminal 20, a server or the like to receive each specification information of the IVI system 10 and the user terminal 20, information on a predefined collection method or analysis method, information generated in a communication section between the IVI system 10, first device data of the IVI system 10, second device data of the user terminal 20, information on artifacts associated with the vehicle infotainment environment and the like. In this case, the server may include an external cloud connected to the user terminal 20, an investigation agency server and the like.

To this end, the communicator 120 may perform wireless communication such as 5th generation communication (5G), long term evolution-advanced (LTE-A), long term evolution (LTE), wireless fidelity (Wi-Fi), or wired communication such as local area network (LAN), wide area network (WAN) and power line communication.

The display 130 displays display data according to the operation of the electronic device 100. The display 130 may display a screen for displaying identified specification information, a screen for displaying collected data, a screen for displaying artifacts extracted by analyzing data, a screen for displaying verification results and the like.

The display 130 may include a liquid crystal display (LCD), a light emitting diode (LED) display, an organic LED (OLED) display, a micro-electro mechanical systems (MEMS) display and an electronic paper display. The display 130 may be combined with the input device 110 and implemented as a touch screen.

The storage 140 stores operating programs of the electronic device 100. The storage 140 includes a non-volatile storage that can retain data (information) regardless of whether electric power is provided, and a volatile memory that can load the data to be processed by the processor 150 and cannot retain data if electric power is not provided. Examples of the storage include flash-memory, hard-disc drive (HDD), solid-state drive (SSD), read-only memory (ROM) and the like, and examples of the memory include a buffer, a random access memory (RAM) and the like.

The storage 140 may store each specification information of the IVI system 10 and the user terminal 20, information about a predefined collection method or analysis method, collected data, information about artifacts associated with the vehicle infotainment environment and the like. The storage 140 may store calculation programs and the like that are required in the process of performing specification information identification, data collection, analysis, artifact verification and the like.

The processor 150 may execute software such as a program to control at least one other component (e.g., a hardware or software component) of the electronic device 100 and perform various data processing or calculations.

The processor 150 according to an exemplary embodiment of the present invention identifies each specification information of an in-vehicle infotainment (IVI) system and a user terminal communicating with the IVI system, collects communication section data generated in a communication section between the IVI system and the user terminal, first device data of the IVI system and second device data of the user terminal through collection methods prepared in response to the specification information, extracts artifacts associated with the vehicle infotainment environment by analyzing the communication section data, the first device data and the second device data through analysis methods prepared in response to the specification information, and verifies the artifacts through mutual comparison between the communication section data, the first device data and the second device data.

Meanwhile, the processor 150 may perform at least some of the data analysis, processing and result information generation for performing the above operations by using at least one of machine learning, neural network or deep learning as a rule-based or artificial intelligence algorithm. Examples of the neural network may include models such as a Convolutional Neural Network (CNN), a Deep Neural Network (DNN) and a Recurrent Neural Network (RNN).

Figure 3:
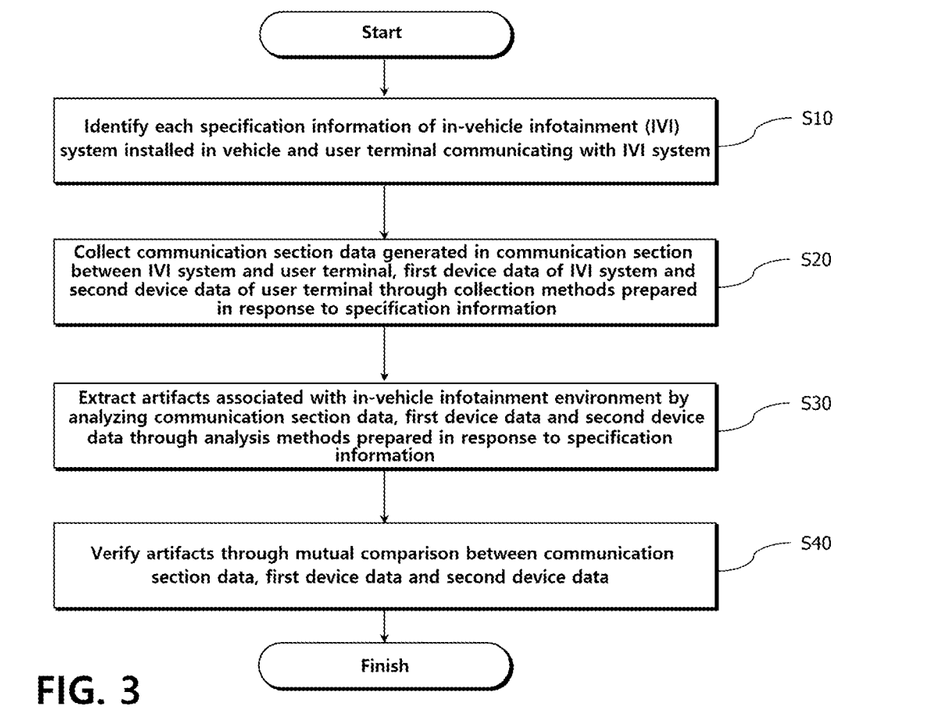
FIG. 3 is a diagram illustrating the operation flowchart of an electronic device according to an exemplary embodiment of the present invention.

FIG. 3 is a diagram illustrating the operation flowchart of an electronic device according to an exemplary embodiment of the present invention.

According to an exemplary embodiment of the present invention, the processor 150 identifies each specification information of the IVI system 10 and the user terminal 20 (S10).

Prior to performing digital forensics on the in-vehicle infotainment environment, it is necessary to identify the specification information of devices constituting the in-vehicle infotainment environment as a preliminary investigation. Depending on the specification information, an appropriate digital forensic method can be applied in data collection and analysis procedures, and the specifications to be investigated are as follows. In this case, the IVI system 10 and the user terminal 20 are considered as a digital forensic target IVI system and a user terminal.

According to an exemplary embodiment of the present invention, the specification information for the IVI system 10 includes PCB specifications, the presence of external storage, the operating system type and the operating system version, and the specification information for the user terminal 20 includes PCB specifications, the operating system type and the operating system version.

In this case, the processor 150 may transmit a signal for requesting specification information to the IVI system 10 and the user terminal 20, and receive the specification information as a response signal thereto, or obtain specification information by operating a program that extracts specification information from the IVI system 10 and the user terminal 20. In addition to the above, the processor 150 may obtain specification information by receiving a user input for inputting specification information through the input device 110. In this way, there may be various ways of receiving specification information, and the present invention is not limited to any one thereof.

The specific details of using specification information are described in detail in the collection and analysis stage.

According to an exemplary embodiment of the present invention, the processor 150 collects communication section data generated in a communication section between the IVI system 10 and the user terminal 20 through collection methods prepared in response to specification information, first device data of the IVI system 10 and second device data of the user terminal 20 (S20).

The IVI system 10 and the user terminal 20 may be connected through wired communication and/or wireless communication, and wired communication refers to wired connection through a vehicle connector such as a USB port, and wireless communication refers to Bluetooth communication and Wi-Fi communication. In the present invention, a digital forensic method in the case of wireless communication is described, and hereinafter, communication section data means wireless communication section data.

The collection method according to an exemplary embodiment of the present invention refers to an operation performed to collect data to be collected or a collecting path, and the collection method may be provided in response to the specification information. In addition, the collection method may be defined as a command or a protocol, and it may be variously used, such as being triggered according to the input of specification information.

In this case, the specific process of collecting the communication section data, the first device data and the second device data will be described with reference to FIG. 4.

According to an exemplary embodiment of the present invention, the processor 150 extracts artifacts associated with the in-vehicle infotainment environment by analyzing the communication section data, the first device data and the second device data through analysis methods prepared in response to the specification information (S30).

The analysis method according to an exemplary embodiment of the present invention refers to an operation performed to analyze collected data, and the analysis method may be prepared in response to the specification information or properties of collected data, respectively. The analysis method may also be defined as a command or protocol, and it may be used in various ways, such as being triggered according to the input of collected data.

Figure 5:
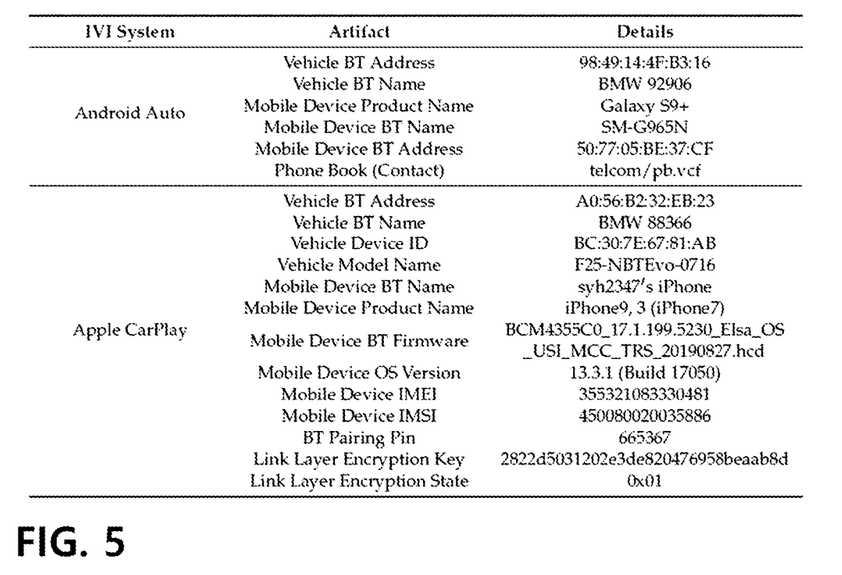
FIG. 5 is a diagram illustrating the artifact list of a communication section between an in-vehicle infotainment system and a user terminal according to an exemplary embodiment of the present invention.
Figure 6:
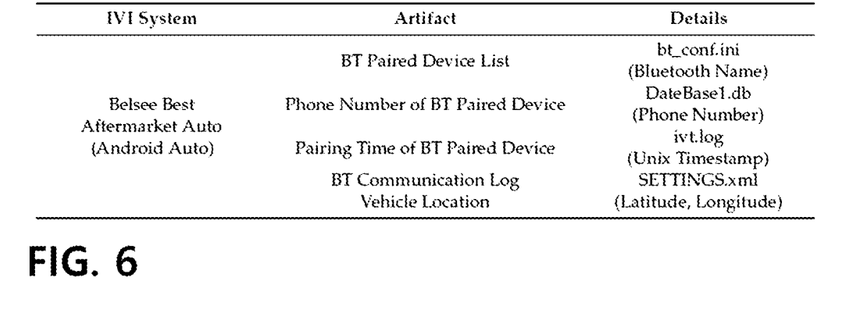
FIG. 6 is a diagram illustrating the artifact list of an in-vehicle infotainment system according to an exemplary embodiment of the present invention.
Figure 7:
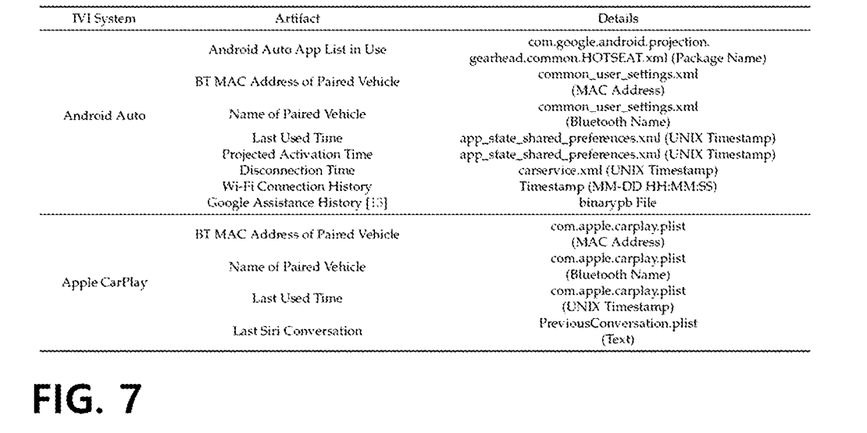
FIG. 7 is a diagram illustrating the artifact list of a user terminal according to an exemplary embodiment of the present invention.

The artifacts associated with the in-vehicle infotainment environment collectively refer to digital evidence that can be obtained through digital forensics, and may include information recorded as the user terminal 20 is connected to the IVI system 10 and uses the infotainment function, information associated with the owners of vehicles and user terminals and the like. Examples of artifacts obtained for each collected data are illustrated in FIGS. 5 to 7.

The processor 150 may derive artifacts associated with the in-vehicle infotainment environment through the analysis of communication section data. Specifically, the processor 150 may analyze the collected data by using a tool that collects and analyzes communication packets, such as Wireshrk.

In addition, the processor 150 may analyze the first device data through an analysis method (hereinafter, referred to as a first analysis method) prepared in response to the operating system type and operating system version of the IVI system 10 among the specification information, and analyze the second device data through an analysis method (hereinafter, referred to as a second analysis method) provided in response to the operating system type and operating system version of the user terminal 20 among the specification information.

Specifically, the processor 150 may perform an investigation on the file system used by the operating systems of the IVI system 10 and the user terminal 20, and use a digital forensic tool, for example, EnCase or FTK (Forensic Tool-Kit), to apply an appropriate file system forensic method.

According to an exemplary embodiment of the present invention, the processor 150 verifies artifacts through mutual comparison between communication section data, first device data and second device data (S40).

This step is a cross-validation step, and the results analyzed in S30 are compared. The comparison may be performed in various ways, from the driver's personal information to the identification information of the IVI system 10 and the user terminal 20, and based on this, the cross-verification of communication section data and each device data may be performed.

Since the wireless communication section is easily exposed to the outside, it is essential to comply with the encrypted communication and personal information protection system. However, it is difficult to confirm because it is generally not easily disclosed to users. The technique proposed in the present invention can expand the range of digital forensics and driver's personal information protection against cyber-attack threats that may occur in the wireless communication section by directly collecting and analyzing the wireless communication section data of the in-vehicle infotainment environment.

Further, in the field of digital forensic investigation, defining a clear collection target is an important subject. Therefore, in the current situation where digital forensic methods and procedures for the vehicle infotainment environment have not been established, it is necessary to define clear collection targets. Since the present technique analyzes the wireless communication section of the vehicle infotainment environment and collects and indexes digital evidence stored in each device, it is possible to expect good effects in the economic and social aspects in the field of digital forensic investigation based thereon.

Current digital forensic related art in the field of vehicles is limited to ECUs. In a situation where the in-vehicle infotainment environment that operates in connection with the driver's smartphone is rapidly applied to daily life, it is necessary to protect the driver's personal information and collect digital evidence stored in each device. The technique proposed by the present invention is expected to be mainly applicable to most vehicles in which the IVI system is used.

Figure 4:
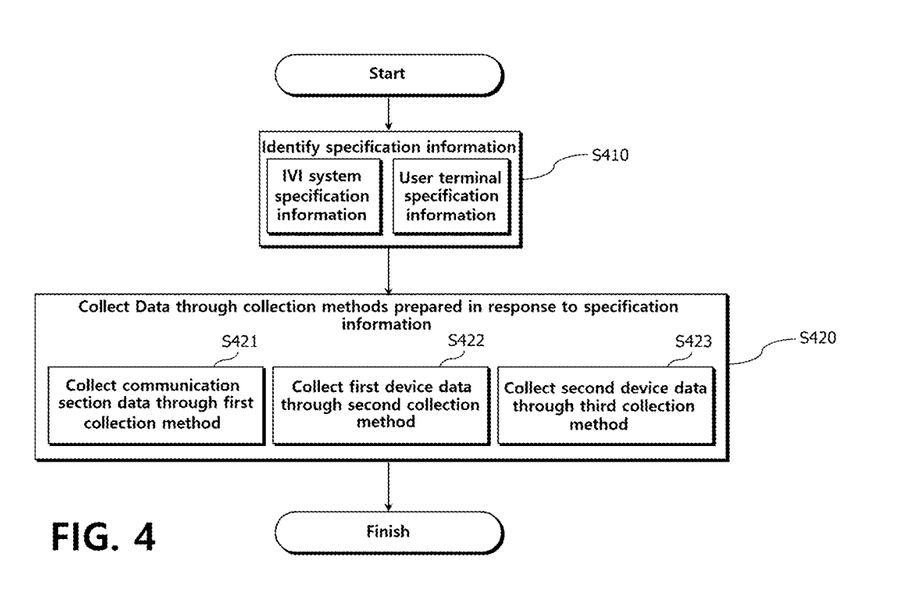
FIG. 4 is a diagram illustrating the data collection operation flowchart of an electronic device according to an exemplary embodiment of the present invention.

FIG. 4 is a diagram illustrating the data collection operation flowchart of an electronic device according to an exemplary embodiment of the present invention.

FIG. 4 describes in detail collection methods for collecting communication section data, first device data and second device data, respectively, in relation to S20 of FIG. 3. In this case, since S410 in FIG. 4 corresponds to S10 in FIGS. 3 and S420 in FIG. 4 corresponds to S20 in FIG., respectively, the contents of FIG. 3 will be referenced for the overlapping contents.

According to an exemplary embodiment of the present invention, the processor 150 identifies the specification information of the IVI system 10 and the specification information of the user terminal 20 (S410).

The processor 150 may collect data through collection methods prepared in response to the specification information (S420).

Specifically, the processor 150 may collect communication section data through a collection method (hereinafter, referred to as a first collection method) provided in response to the operating system type and operating system version of the user terminal 20 among the specification information (S421).

The first collection method according to an exemplary embodiment of the present invention collectively refers to a method for collecting communication section data, and it may include a plurality of collection methods provided in response to specification information that is necessary for collecting communication section data.

In this case, the processor 150 may additionally consider the type of communication section in the process of collecting communication section data. The type of communication section includes a Bluetooth communication section and a Wi-Fi communication section, and it is determined by a communication method between the IVI system 10 and the user terminal 20.

The operating system type of the user terminal 20 includes an Android operating system and an iOS operating system, and each operating system may have different paths for storing data or supported functions depending on the version of the operating system. Accordingly, the collection method may be prepared not only for each operating system type, but also for each operating system version.

When the IVI system 10 performs Bluetooth communication with the user terminal 20 by using the Android operating system, the first collection method is as follows.

The Android operating system supports a log function (Bluetooth HCI Snoop) that records data about the Bluetooth communication section. Accordingly, the processor 150 may obtain communication section data from the internal storage of the user terminal 20 for which the log function is activated.

In this case, the first collection method may include information on a path where communication section data is stored (e.g., /data/misc/Bluetooth/logs/btsnoop_hci.log), and the path may differ in some ways depending on the operating system version of the user terminal 20.

When the IVI system 10 performs Wi-Fi communication with the user terminal 20 by using the Android operating system, the first collection method is as follows.

The processor 150 may collect communication section data by using Android Debug Bridge (ADB), which is a debugging program for the Android operating system, and a tcpdump library. In this case, the command for collecting communication section data in the user terminal 20 by using ADB is as follows: 'adb exec-out "tcpdump-i any-U-w-2>/dev/null"|wireshark-k-S-i-'.

When the IVI system 10 performs Bluetooth communication with the user terminal 20 by using the iOS operating system, the first collection method is as follows.

The processor 150 may collect communication section data according to Bluetooth communication by using a collection program PacketLogger, which is supported by Xcod that is an Apple integrated development environment for macOS.

When the IVI system 10 performs Wi-Fi communication with the user terminal 20 by using the iOS operating system, the first collection method is as follows.

The processor 150 may mirror the Wi-Fi communication section of the user terminal 20 by using Xcode, which is an Apple integrated development environment for macOS. Afterwards, it is possible to collect communication section data according to Wi-Fi communication by selecting the mirrored interface in Wireshark, which is a commercial communication packet collection and analysis tool.

In addition to the above, the first collection method for collecting communication section data may be provided in various ways, and the present invention is not limited to any one of the methods listed above.

In addition, the processor 150 may collect the first device data through a collection method (hereinafter, referred to as a second collection method) prepared in response to the PCB specification of the IVI system 10 and the presence of an external storage among the specification information (S422).

The second collection method according to an exemplary embodiment of the present invention collectively refers to methods for collecting the first device data, and it may include a plurality of collection methods provided in response to specification information that is necessary for collecting first device data.

The processor 150 may apply an appropriate data collection method based on the result of investigating the PCB specifications of the IVI system 10. The processor 150 may utilize a debugging interface, for example, a joint test action group (JTAG) or a universal asynchronous receiver-transmitter (UART), in order to collect the first device data.

When a flash memory is mounted on the PCB of the IVI system 10, chip-off of the flash memory is performed, and the processor 150 may collect the first device data from the flash memory. In this case, the first device data may be collected by inserting a chip-off flash memory into the electronic device 100.

If a separate external storage such as a hard disk drive (HDD) is present in the IVI system 10, the first device data may be collected after removing the HDD.

Finally, the processor 150 may collect the second device data through a collection method (hereinafter, referred to as a third collection method) prepared in response to the PCB specification, operating system type and operating system version of the user terminal 20 among the specification information (S423).

The third collection method according to an exemplary embodiment of the present invention collectively refers to methods for collecting second device data, and it may include a plurality of collection methods provided in response to specification information that is necessary for collecting second device data.

The processor 150 may obtain administrator authority by performing rooting or jailbreaking according to the operating system of the user terminal 20 and may collect second device data based on the administrator authority.

When a flash memory is mounted on the PCB of the user terminal 20, chip-off of the flash memory may be performed, and the processor 150 may collect second device data from the flash memory. In this case, the second device data may be collected by inserting a chip-off flash memory into the electronic device 100.

In this case, the operation of collecting each data in steps S421 to S423 may be performed sequentially or in parallel.

FIG. 5 is a diagram illustrating the artifact list of a communication section between an in-vehicle infotainment system and a user terminal according to an exemplary embodiment of the present invention.

The artifacts of FIG. 5 are obtained by analyzing communication section data according to Bluetooth communication between the IVI system and the user terminal, and the obtained artifacts include not only vehicle information but also information that is directly related to the connected user terminal.

Meanwhile, artifacts are significant in themselves, but they may also be used for cross-validation with other analysis sections, thereby increasing the reliability of the overall analysis results.

FIG. 6 is a diagram illustrating the artifact list of an in-vehicle infotainment system according to an exemplary embodiment of the present invention.

The artifacts of FIG. 6 were obtained by analyzing the first device data of the IVI system, and as a result of analyzing the internal storage of the IVI system, four artifacts of Belsee Best Aftermarket Auto were obtained. Since the BT name and BT address of the user terminal connected to the vehicle are included, it will be possible to cross-verify with the artifacts obtained from the wireless communication between the IVI system and the user terminal and the internal storage analysis of the user terminal. In addition, vehicle usage time and location information artifacts that are difficult to obtain from the user terminal may be derived.

FIG. 7 is a diagram illustrating the artifact list of a user terminal according to an exemplary embodiment of the present invention.

The artifacts of FIG. 7 are obtained by analyzing the second device data of the user terminal, and show artifacts according to the result of analyzing the internal storages of the user terminal of the Android operating system and the user terminal of the iOS operating system. In this case, the derived artifacts are artifacts that are directly associated with the use of the IVI system by the user terminal.

In addition, it is certain that the acquired artifacts may be used for cross-validation with other analysis results.

EXPLANATION OF REFERENCE NUMERALS

100: Electronic device
110: Input device
120: Communicator
130: Display
140: Storage
150: Processor

The invention claimed is:

1. An electronic device for performing digital forensics on an in-vehicle infotainment environment, comprising:
a processor configured to:
identify each specification information of an in-vehicle infotainment (IVI) system installed in a vehicle and a user terminal communicating with the IVI system,
collect communication section data generated in a communication section between the IVI system and the user terminal, first device data of the IVI system and second device data of the user terminal through collection methods prepared in response to the specification information,
extract artifacts associated with the in-vehicle infotainment environment by analyzing the communication section data, the first device data and the second device data through analysis methods prepared in response to the specification information, and
verify the artifacts through mutual comparison between the communication section data, the first device data and the second device data.

2. The electronic device of claim 1, wherein the processor is configured to collect the communication section data through a first collection method prepared in response to an operating system type and operating system version of the user terminal among the specification information.

3. The electronic device of claim 2, wherein the processor is configured to collect the first device data through a second collection method prepared in response to the PCB specification of the IVI system and the presence of an external storage among the specification information.

4. The electronic device of claim 3, wherein the processor is configured to collect the second device data through a third collection method prepared in response to the PCB specification, operating system type and operating system version of the user terminal among the specification information.

5. The electronic device of claim 1, wherein the processor is configured to analyze the first device data through a first analysis method prepared in response to an operating system type and operating system version of the IVI system among the specification information, and analyze the second device data through a second analysis method prepared in response to an operating system type and operating system version of the user terminal among the specification information.

6. A method for performing digital forensics on an in-vehicle infotainment environment which is performed by an electronic device, comprising the steps of:
identifying each specification information of an in-vehicle infotainment (IVI) system installed in a vehicle and a user terminal communicating with the IVI system;
collecting communication section data generated in a communication section between the IVI system and the user terminal, first device data of the IVI system and second device data of the user terminal through collection methods prepared in response to the specification information;
extracting artifacts associated with the in-vehicle infotainment environment by analyzing the communication section data, the first device data and the second device data through analysis methods prepared in response to the specification information; and
verifying the artifacts through mutual comparison between the communication section data, the first device data and the second device data.

7. The method of claim 6, wherein the step of collecting comprises the step of:
collecting the communication section data through a first collection method prepared in response to an operating system type and operating system version of the user terminal among the specification information.

8. The method of claim 7, wherein the step of collecting comprises the step of:

collecting the first device data through a second collection method prepared in response to the PCB specification of the IVI system and the presence of an external storage among the specification information.

9. The method of claim 8, wherein the step of collecting comprises the step of:
collecting the second device data through a third collection method prepared in response to the PCB specification, operating system type and operating system version of the user terminal among the specification information.

10. The method of claim 6, wherein the step of analyzing comprises the steps of:
analyzing the first device data through a first analysis method prepared in response to an operating system type and operating system version of the IVI system among the specification information; and
analyzing the second device data through a second analysis method prepared in response to an operating system type and operating system version of the user terminal among the specification information.

\* \* \* \* \*